(12) United States Patent
Platell (10) Patent No.: US 7,337,838 B2
(45) Date of Patent: Mar. 4, 2008

(54) PLANT FOR TEMPERING OF A BUILDING

(75) Inventor: Ove Platell, Sigtuna (SE)

(73) Assignee: Lowte AB, Sigtuma (SE)

( * ) Notice: Subject to any disclaimer, the term of this patent is extended or adjusted under 35 U.S.C. 154(b) by 638 days.

(21) Appl. No.: 10/502,664

(22) PCT Filed: Jan. 31, 2003

(86) PCT No.: PCT/SE03/00167

§ 371 (c)(1),
(2), (4) Date: Jul. 26, 2004

(87) PCT Pub. No.: WO03/069239

PCT Pub. Date: Aug. 21, 2003

(65) Prior Publication Data

US 2005/0092480 A1    May 5, 2005

(30) Foreign Application Priority Data

Jan. 31, 2002  (SE) .................................. 0200287

(51) Int. Cl.
F24F 11/04 (2006.01)
F24F 11/06 (2006.01)
(52) U.S. Cl. ...................................... 165/247; 165/45
(58) Field of Classification Search .............. 165/45, 165/247, 244, 287
See application file for complete search history.

(56) References Cited

U.S. PATENT DOCUMENTS

| 4,735,257 A | 4/1988 | Platell |
| 5,014,770 A * | 5/1991 | Palmer ....................... 165/48.2 |
| 5,209,286 A * | 5/1993 | Schmidt ....................... 165/45 |
| 5,392,611 A * | 2/1995 | Assaf et al. ................... 237/81 |
| 5,438,846 A * | 8/1995 | Datta ......................... 62/238.7 |
| 5,671,608 A * | 9/1997 | Wiggs et al. .................. 165/45 |

FOREIGN PATENT DOCUMENTS

| EP | 0 006 643 A2 | 1/1980 |
| EP | 0 047 223 A1 | 3/1982 |
| EP | 0 102 987 B1 | 1/1986 |
| SE | 408 087 | 5/1979 |
| SE | 450 289 | 6/1987 |
| SE | 458 061 | 2/1989 |
| SE | 460 731 | 11/1989 |
| WO | WO 00/36343 A1 | 6/2000 |

* cited by examiner

*Primary Examiner*—Ljiljana Ciric
(74) *Attorney, Agent, or Firm*—Frishauf, Holtz, Goodman & Chick, P.C.

(57) ABSTRACT

A plant for tempering a building, including an energy storage unit formed by ground heat exchangers coupled in parallel and each including a heat insulated leg and a non-insulated leg in thermal contact with surrounding soil. The heat exchangers are included in a circulating circuit for a circulation fluid which includes a circulation pump and room temperature keeping devices. The energy storage unit has a continuously varying temperature in a depth direction from a cold end to a warm end. The flow direction in the ground heat exchangers is controlled by a reversing valve such that for a warm keeping function, circulation fluid is received from the warm end and for a cool keeping function, circulation fluid is received from the cold end. The circulation pump is controlled such that the circulation flow brings about a temperature difference between the inlet and outlet of the ground heat exchangers that is constant with a value that can be calculated with the aid of the properties of the ground and the actual components.

20 Claims, 6 Drawing Sheets

PLANT FOR TEMPERING OF A BUILDING

This application is a U.S. National Phase Application under 35 USC 371 of International Application PCT/SE03/00167 filed Jan. 31, 2003.

The present invention relates to a plant for tempering a building that includes: an in-ground energy storage unit formed by a plurality of ground heat exchangers coupled in parallel, each ground heat exchanger including a first tube-shaped leg surrounded by heat insulation and a second leg in thermal connection with surrounding soil; at least one room temperature keeping device for at least one room; and a circulation pump for circulating circulation fluid through a circulation circuit, which includes the circulation pump, the first and second legs of the ground heat exchangers, and the at least one room temperature keeping device, and in which the circulation fluid flows down one leg and up the other leg in each of the ground heat exchangers.

The plant comprises mainly a combination of two very special known components. A first such component is the ground heat exchangers, in the following named GHEX, which are of the type described in e.g. the Swedish patent specifications 408 087, 450 289, 458 061 and 513 218. They have a first tubular leg provided with heat insulation, and a second leg in close thermal contact with surrounding soil. Due to the fact that the two legs are in a very bad mutual thermal contact, and the leg without heat insulation is in very god thermal contact with the surrounding soil, the heat exchangers will become extremely efficient and make it possible to obtain a stratification of the temperature in the energy storage. An energy storage comprising a number of ground heat exchangers can be loaded in summer time by conducting a warm circulation fluid down and up through the two legs of each ground heat exchanger and further to a circulation circuit comprising room temperature keeping devices, which are the above mentioned second known component in the building, in the following named RTKD. These devices can be of the type described in the Swedish patent specifications 442 132, 441 535 and 460 731, in the following named RTKD-1, or conventional counter-current heat exchangers, in the following named RTKD-2, which latter are suitable for tempering ventilation air by means of the circulation fluid in the circulation circuit. The room temperature keeping devices known from the patent specifications are intended to be integrated with the outer wall structure of buildings and to bring about a balancing of the transmission losses in the outer walls. The arrangement makes it possible to keep rooms warm at cold ambient temperature, e.g. in winter time, i.e. a direct compensating of transmission losses, with only a few degrees higher forward feeding temperature than the room temperature, and in that case a return temperature considerably below the room temperature. The arrangement gives rise, in a corresponding way, at high ambient temperature, e.g. in summer time, to a cool keeping of rooms with only a few degrees lower forward feeding temperature than the room temperature and in that case a return temperature considerably above the room temperature.

A conventional ground heat energy storage is drained of energy when warm fluid flows from the storage and is replaced by colder fluid. To extend the time for the decay of the storage and to secure that sufficient of energy is left at the end of the winter season, if a late cold period should occur, it might be necessary to occasionally supply heat to the flow of fluid returned to the storage.

In many cases, and especially in countries with a ground temperature amounting up to 20° C., is it known e.g. from the above-mentioned Swedish patent specification 408 087 to alternatively arrange, by means of the above described method, a cooler ground body with a temperature of about 10-15° C. for keeping a building cool, which building is subject to a long term supply of undesired heat.

Thus, if both warm keeping and cool keeping is required, two mutually distant ground bodies are necessary, which involves a great deal of space, and bad operating economy as well as high initial expenses.

The object of the invention is among others to achieve a real improvement in a plant of the type set forth in the introduction, which in a simple way secures that the plant can be used both for warm keeping and cool keeping of the interior of a building by using to the greatest possible extent low quality energy, i.e. natural energy.

This is achieved according to the invention by a plant having the characterizing features of the following claims. Due to the fact that the plant has been built-up by a combination of the two very special above-mentioned components, and the plant is designed to be operated in such a way that, partly the flow quantity of the circulation fluid in the ground heat exchangers is adjusted such that a great and concistent difference is achieved between forward feeding temperature and return temperatur of the circulation fluid, partly the circulation direction in the ground heat exchangers is different at warm and cool keeping, resp., of the buildings, an energy storage is achieved in the ground with downwards stratified temperature and forming a warm and a cold end.

It is possible in principle both to have the warm end at the top and the cold end at the bottom and vice versa. It is especially suitable, however, to locate the cold end at the bottom with the three-dimensional thermal leakage directed towards the surrounding cold ground, in which case the warm end will be located between the cold end and the ground surface. The opposite may be the case in very warm countries where it is necessary to preserve cooling temperatures which may differ a great deal from the natural ground temperature. Hence, the cold end intended for cooling purpose should not be located in the bottom area, sensitive for thermal leakage. In some of such countries the nights are very cold, which makes it easy to collect coldness during the night and heat during the day, at the same time as warm keeping and cool keeping, resp., is carried out after only changing of the fluid flow direction.

The invention will be more completely described in the following with reference to the accompanying drawings, which schematically disclose an example of the realizing of the invention, and in which

FIG. 4 is curves showing the time development during a year of, in FIG. 4a the heat transmission power per meter for a ground heat exchanger, in FIG. 4b the magnitude of the thermal energy transport between the circulation fluid and the driving temperature difference between circulation fluid and the ground bulk at a given ground depth, controlling the ground, in FIG. 4c the magnitude of the temperature variations around the annual mean value at the ground depth in question for the ground bulk temperature and the circulation fluid temperature in the non-insulated leg, and in FIG. 4d the magnitude of the temperature of the circulation fluid comng up from the energy storage;

FIG. 5a is a graph showing the temperature profile of the circulation fluid and the ground at maximum load in the middle of the winter and summer, resp. as a first approximation, and FIG. 5b a graph showing the real shape of the temperature profiles in FIG. 5a;

The drawings show throughout circumstances during summer and winter periods, but the circumstances are in principle similar at shorter periods, e.g. at periodic, in other ways varying ambient temperatures, as during night and day, which in certain geographic areas can vary considerably.

Figure 1A:
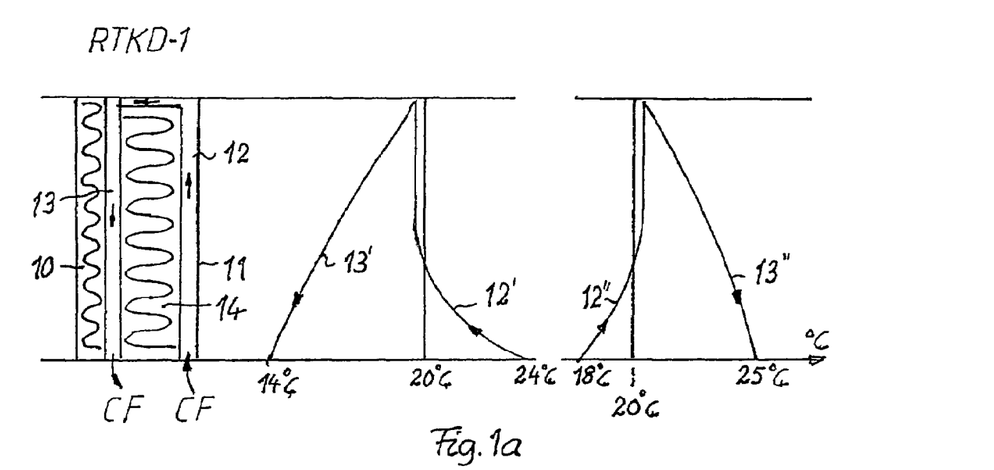
FIG. 1a is a sectional view of a first example of a temperature keeping device (RTKD-1) for balancing heat transmission losses with associated temperature profiles for winter conditions, to the left on the drawing, and sommer conditions, to the right on the drawing.

FIG. 1a shows a room temperature keeping device RTKD-1 with an insulated outer wall 10, an inner wall 11 and further an inner channel 12 and an outer channel 13 which are separated by a heat insulated partition wall 14. A circulation fluid CF flows through the inner channel bows back at the top and flows out through the outer channel 13. It is achieved, as is clearly described in in the above mentioned patents, and especially in 460 731, 442132 and 441 535, with the circulation fluid consisting of liquid exchanged to circulating air in channels as shown above via a counter-current heat exchanger, a warm keeping function in winter time with only a few degrees higher forward feeding temperature than the room temperature, and in that case a return feeding temperature is achieved that is much below the room temperature. In an analogous way a cool keeping is achieved in the summer time with only one or a few degrees lower forward feeding temperature than the room temperature at the same time as the return feeding temperature is conciderably above the room temperature and the forward feeding temperature. In the main reversed temperature profiles are achieved with the room temperature keeping device RTKD-1, which profiles are shown to the right on the drawing, FIG. 1a, for winter and summer conditions. The temperature profile for the fluid in the inner channel 12 is indicated 12' and 12", resp., and the temperature profile for the fluid in the outer channel 13 is indicated 13' and 13", resp., for winter and summer conditions, resp.

Figure 1B:
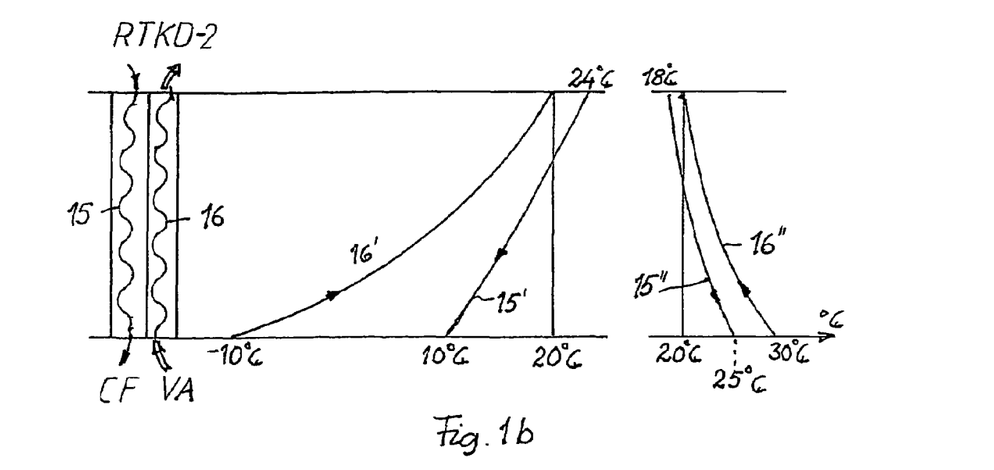
FIG. 1b is a corresponding presentation as in FIG. 1a of the second type of room temperature keeping device (RTKD-2), which is a typical counter-current heat exchanger for tempering of the ventilation air.

FIG. 1b shows the corresponding temperature profiles as FIG. 1a, bur for a room temperature keeping device RTK-2 in the shape of a counter-current heat exchanger, in which heat exchange is obtained between the circulation fluid CF in a channel 15 and a flow of exterior air VA in a channel 16 for room tempering of the ventilation air. The temperature profile for the fluid in the channel 15 is indicated 15' and 15", resp., and the temperature profile for the air in the channel 16 is indicated 16' and 16", resp., for winter and summer conditions, resp.

The characteristic of the two types of room temperature keeping devices are quite analogous with respect to inlet and outlet temperatures.

Figure 2A:
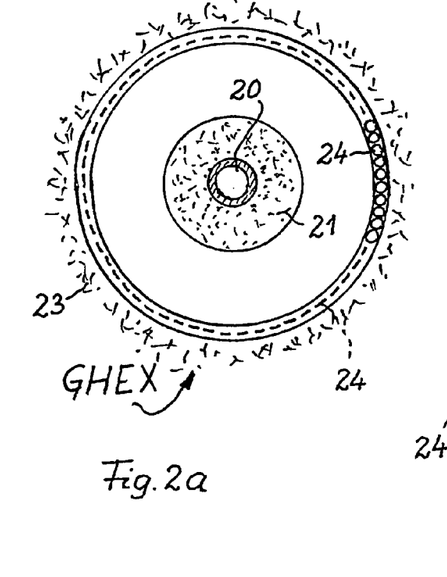
FIGS. 2a and 2b is a cross sectional view of a ground heat exchanger, and a longitudinal sectional view, resp., of a part of the heat exchanger.
Figure 2B:
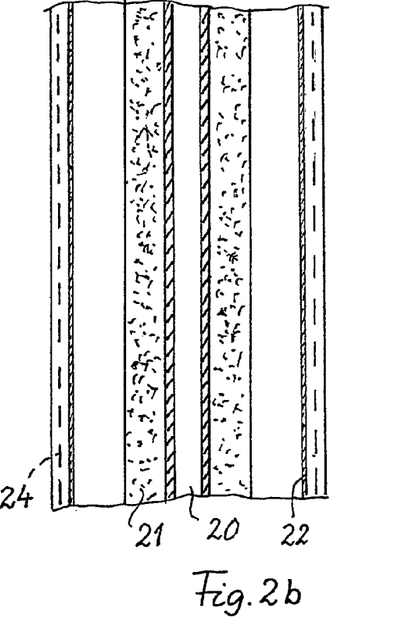

The ground heat exchanger GHEX shown in FIGS. 2a and 2b are of a similar type as the one shown in the above mentioned Swedish patent specification 513 218 and comprises a central tube 20 provided with an exterior heat insulating casing 21. Outside the casing 21 and at a distance from it a sleeve 22 is located in an essentially vertical bore hole in close thermal contact with surrounding soil 23. The sleeve 22 is provided with a great number of axial channels 24 tightly distributed around the circumference of the sleeve. The tube 20 and the channels 24 are the insulated and non-insulated legs, resp., of the ground heat exchanger.

Figure 3:
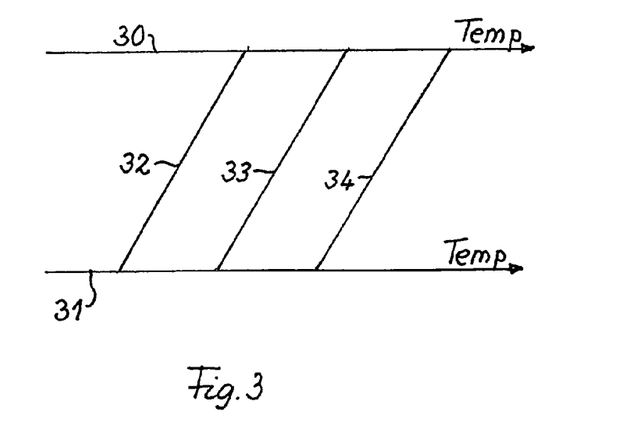
FIG. 3 is a graph showing the temperature profile of the ground bulk at various time periods of the year.

FIG. 3 shows schematically the temperature profile of a ground bulk thermally coupled to a ground heat exchanger at different times of the year, wherein the line 30 indicates the ground surface, which above the ground bulk usually is covered by a heat insulating plate or building (not shown). The bottom of the energy storage is indicated by a line 31. Between the lines three sloping lines extend, which are essentially parallel. The lines 32,33 and 34 indicate the temperature profile at spring, summer, winter and autumn, resp. The temperature profiles show that the temperature profile of the ground will be displaced in parallel with itself during the year and reciprocate between two turning positions, the lines 34,32 representing the state of completely full loaded and completely unloaded energy storage.

Figure 4A:
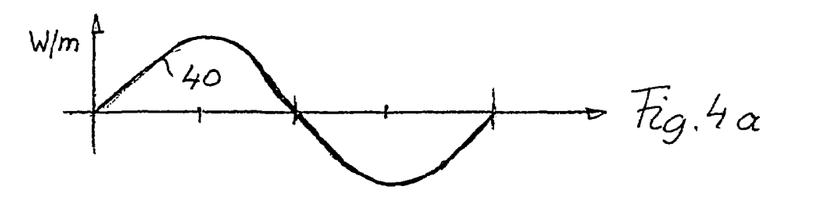
Figure 4B:
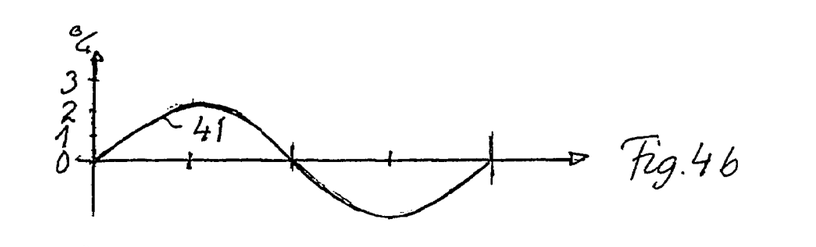

FIGS. 4a-d show course of events by time over the year for different thermal parameters connected to the temperature keeping devices RTKD and ground heat exchangers GHEX. The time concepts spring, summer, autumn and winter are marked along the horizontal time axes. FIG. 4a shows a curve 40 similar to a sinus curve, which represents the heat transfer power per meter, W/m, of a ground heat exchanger GHEX. The loading has a maximum during the summer and the unloading has a maximum during the winter. The heat transfer power of the ground heat exchanger is created by a "driving" temperature difference between the circulation fluid in the leg 24 of the ground heat exchanger and the bulk of the ground. This temperature difference at a given depth in the ground is represented by the curve 41 in FIG. 4b and has maxima at the same points of time as the curve 40 in FIG. 4a.

Figure 4C:
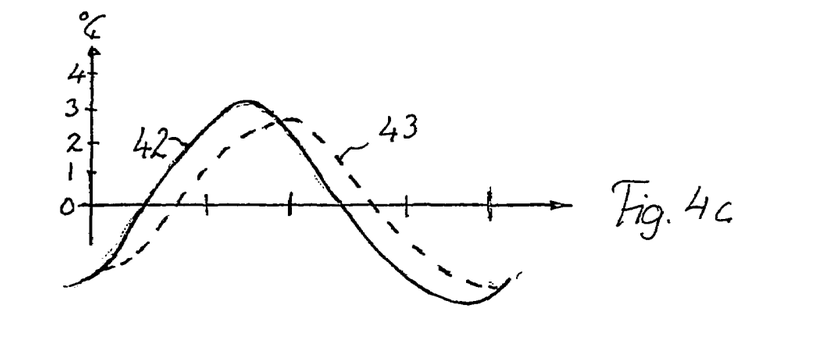

The temperature variations round a mean annual value is illustrated by FIG. 4c, in which a full curve 42, which shows the temperature variations of the circulation fluid in the non-insulated leg 24, and a dashed curve 43 shows the temperature variations of the ground bulk at the actual depth in the ground.

Figure 4D:
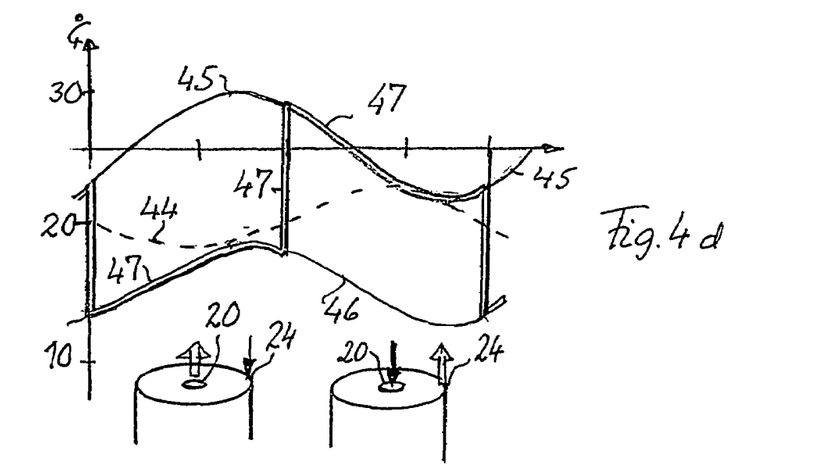

In FIG. 4d a dashed curve 44 shows the necessary forward feeding temperature of the circulation fluid during a year. The temperature in the non-insulated leg 24 at the surface of the ground then will be represented by the full curve 45, and the temperature of the insulated leg 20 both at the bottom and at the surface will be represented by the full curve 46.

The circulation fluid flows up from the insulated leg 20 during the summer and during the winter from the non-insulated leg 24, as is schematically indicated below FIGS. 4a-d, which means that the circulation fluid that flows up from the energy storage has a temperature that follows the curve 47 indicated by double lines in FIG. 4d.

Figure 5A:
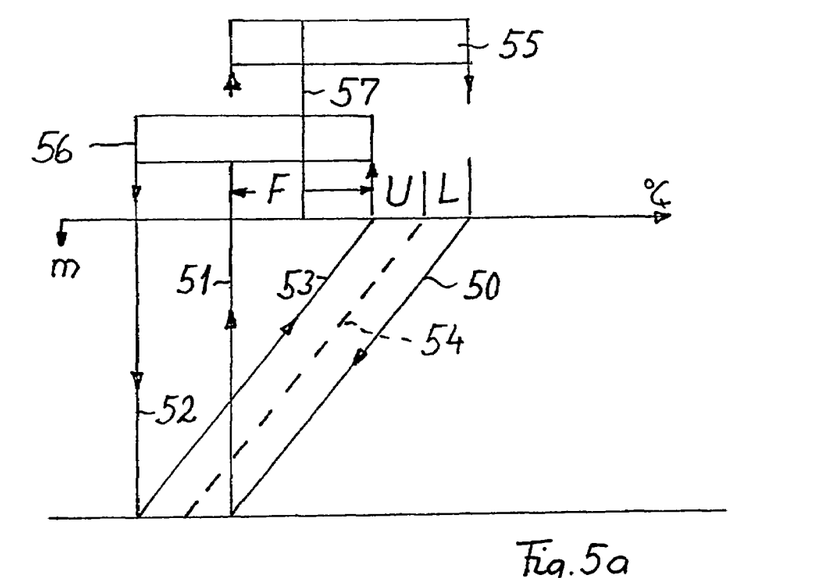

From FIG. 4a is evident, that the maximum heat transfer power at loading as well as unloading occurs when the ground has its mean annual temperature at the actual depth. This means that the operation conditions of the ground heat exchanger at the two significant and dimensioning occasions of the year when maximum power should be transferred to or from, resp., the ground can be illustrated by a single diagram shown in FIG. 5a. The circulation direction of a ground heat exchanger GHEX is different at transfer of energy to and from, resp., the ground—i.e. summer and winter, resp.,—and that the outlet from the ground heat exchanger—i.e. delivery of energy—takes place from different legs summer and winter, resp. At maximum loading and unloading at each depth it will be necessary to have a driving temperature difference between the circulation fluid in the non-insulated leg and the ground bulk. The magnitude of this depends on the thermal resistance and desired heat power. The necessary driving temperature difference can be very low at ground heat exchangers of the type discussed here, only one or a few degrees. The driving temperature difference is at each time moment essentially the same at each depth, and, thus, delivers the same power per meter of the depth of the ground heat exchanger. Hence, a linear change of of the temperature of the circulation fluid in the non-insulated leg is achievd, but the flow in the thermal insulated leg has a constant temperature. In FIG. 5a the line 50 shows the temperature in the middle of the summer of the circulation fluid in the non-insulated leg from the top of the energy storage to its bottom where the fluid flows over to the insulated leg with a constant temperature indicated by a vertical line 51. The circlation fluid is fed down in the middle of the winter in the insulated leg, in which the temperature is constant and represented by a vertical line 52. At the bottom of the leg the fluid is transferred to the non-insulated leg in which the temperature increases along a line 53. The ground temperature in the middle of the summer as well as the winter follows a dashed line 54.

Figure 5B:
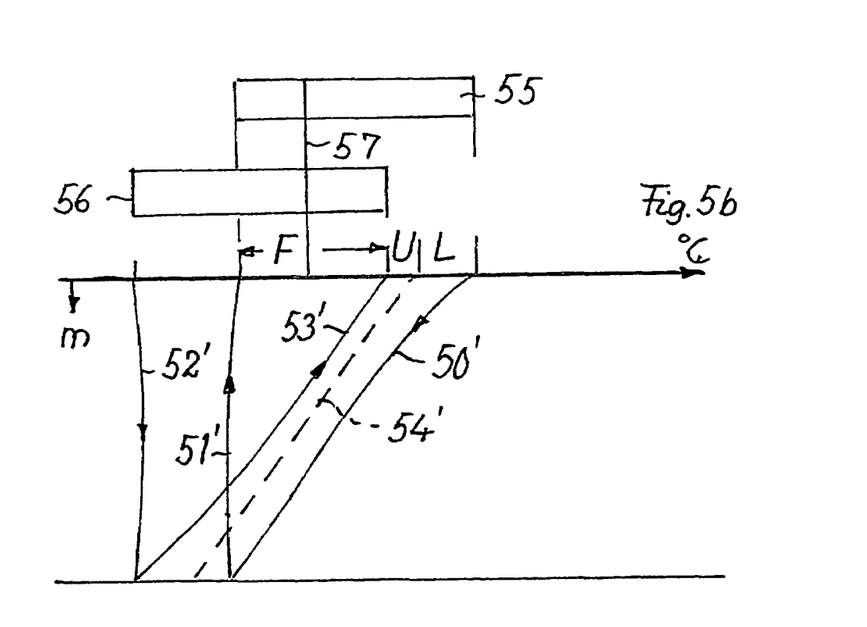

FIG. 5a is an approximation which for example does not consider vertical conduction in the ground and that the insulated leg of the ground heat exchanger of course cannot have a perfect thermal insulation. The true courses and shapes of the temperature profiles are as shown in FIG. 5b, where the straight lines 50-53 in FIG. 5a are shown somewhat curved in FIG. 5b and are denoted 50'-53'. The temperature profile of the ground is here denoted 54' and has a somewhat changed slope as compared with curve 54 i FIG. 5a.

From FIG. 5a and FIG. 5b is evident, that the energy that has to be collected for warm keeping, a half year later has a temperature range 55, and energy that has to be collected for cool keeping, a half year later has a temperature range 56. These temperature ranges overlap each other to a great extent and both include the intended room temperature which is indicated by a line 57.

The observation of these surprising and remarkable facts lays the foundation of the possibility of collecting natural energy by simple means and makes it possible to to create very robust and economical plants for tempering of buildings.

By the combination of components and operating strategy here shown, an energy storage is created with a comparatively warm and cold end. It is possible in principle to project a system with th warm end either in the bottom or at the ground surface, but the total heat leakage from the storage usually becomes lower with the warm end at the top and the cold end at the bottom where the leakage pattern is three-dimensional, which consequently makes the heat leakage sensitive to great temperature differens between the storage and the natural temperature of the ground. The cold end of the storage has a temperature, which at least in Scandinavian zones is rather close to the natural temperature of the ground, and therefore the thermal leakage becomes relatively small.

It may possibly be meaningful in warm countries to locate the warm end in the bottom because it is important to take care of the cooling temperature, which can be far from the natural temperature of the ground, which means that the cold end for cool keeping shall not be located in the bottom zone sensitive to thermal leakage.

The upper end of the storage, whether warm or cold, is usually thermally insulated by an insulating layer or a building on top of the storage.

Demands for the design of utilized components and operating conditions that have to be fulfilled for meeting the thermal part of the demand on total energy needs for tempering a room by only natural energy, can be summarized by the following:

A plant comprises in the first place a combination of necessary components like room temperature keeping devices and ground heat exchangers. The plant is operated with such an operating strategy that the circulation direction is different during summer and winter, and that the circulation flow is adjusted such, that the temperature difference S between the inlet to and outlet from the ground heat exchanger always is kept at a constant value, that is at least 50%, preferably about 100% of the value $S_{min}$ for a given plant, which value is equal to F+U+L, where:

F=the temperature difference between necessary forward feeding temperature to the room temperature keeping devices at maximum warm keeping power at cold ambient temperature and at maximum cool keeping power at warm ambient temperature;

U=necessary driving temperature difference at the ground surface between the ground and the circulation fluid in the non-insulated leg at maximum heat power outlet from the ground at cold ambient temperature;

L=necessary driving temperature difference at the ground surface between the ground and the circulation fluid in the non-insulated leg at maximum cool power outlet from the ground at warm ambient temperature.

Hence, the quantity $S_{min}$ above is a fixed quantity that is settled at the projecting and dimensioning of a plant and where F is decided by the properties of the utilized RTKD components. The two quantities U and L are decided by the properties of the GHEX components and the ground.

The control signal that controls the flow of the pump 65 consists of the differing from actual, i.e. continuously measured, temperature difference S from the wanted constant value $S_{min}$. At too large value S the flow will increase so that S decreases and vice versa according to known art. This means that the temperature difference S, independent of the load conditions of the plant, will be adjusted close to the wanted value Smin.

This operating strategy leads to the formation of a warm end and a cold end of the energy storage (compare FIG. 5b), which lays the foundation of the following unique distinguishing feature:

The warm end of the storage has a sufficiently high temperature for warm keeping during winter time, i.e. at cold ambient temperature, by means of room temperature keeping devices, RTKD, but low enough to permit the use of heat energy of very low energy quality for loading of heat to the energy storage. At cool keeping—summer time—the room temperature keeping devices, RTKD, will supply cool energy with a temperature that is higher than the room temperature, which results in that this component works as a heat energy collector. If this energy in some cases should be insufficient, is it easy to to collect complementary energy by simple means. Even simple solar collectors without glazing are effective on these conditions for collecting energy with high efficiency. Collection of energy for warm keeping may also be effected from low-quality, and thus cheap, waste heat.

Further, the cold end of the energy storage has a sufficiently low temperature for cool keeping by means of room temperature keeping devices, RTKD, but, however, so high that cooling energy easily can be collected in winter time by means of room temperature keeping device, RKTD, if necessary completed with special collectors for low-quality energy, which may be the case at places with a very great need of cool keeping. At places with inland climate or high mean annual temperature cool collection takes place in the winter and in the night, resp., which can be carried out by exposure of surfaces of colletcors for low-quality energy to clear and cold night sky.

In all the above reasoning it is presumed that all the need of thermal energy for tempering should be received via the energy storage in ground that is loaded with natural energy, i.e. no high-quality energy in state of energy generated by equipment for temporary energy production is necessary at normal operation. It is for different reasons possible to consider in certain situations to quite deliberately refrain from reaching this limit for complete energy autonomy. One may be content with only a partial use of the potential of the system.

To illustrate what unconventional temperatures is all about, an exemplification is given in the following in connection to FIG. 6 and FIG. 7, which schematically show a simple plant according to the invention at winter operation in FIG. 6, and at summer operation in FIG. 7, and with the temperature structure for the different components shown to the right in the figures and on a level with the respective components. The exemplification is definitely no optimization, but the object is to illustrate the fundamental opportunities to utilize a ground heat storage with a warm and a cold end. The exemplification illustrates a dimensioning so adapted that no additional collecting of coolness in the winter is necessary with a collecting device for low-quality energy. A device of this type is necessary only in the summer. e.g. a simple solar collector, for completion of the collecting of heat that is made to 25° C. by room temperature keeping devices. No shunting is used in the two shown operating conditions, because these represent dimensioning maximum load for warm keeping and cool keeping, resp. At partial load shunting with a valve 74 is necessary for reaching a suitable forward feeding temperature to the room temperature keeping devices. The dimensioning example is further adapted, to elucidate the fundamental principles, for such a system size that the heat leakage becomes negligible.

Figure 6:
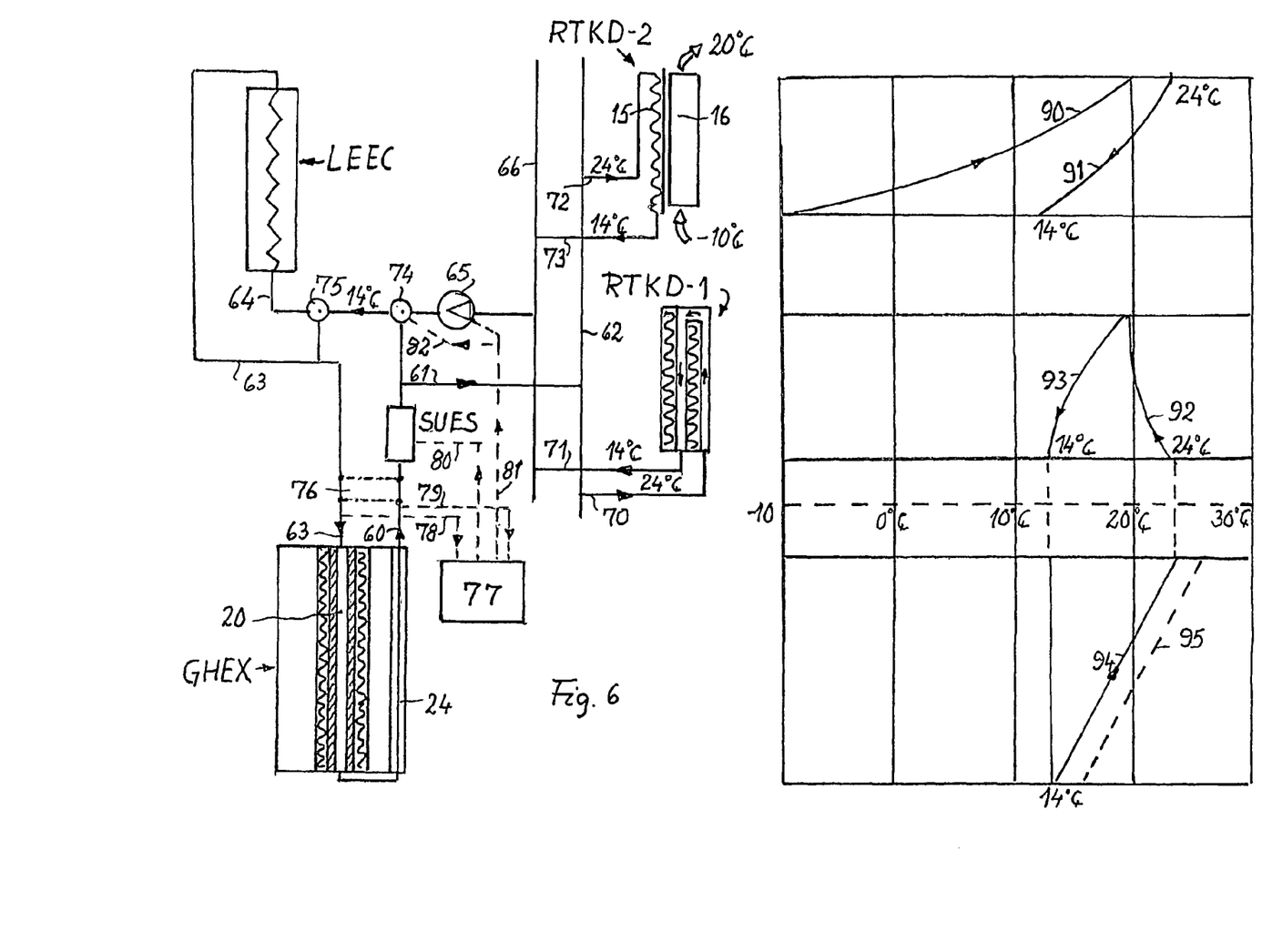
FIG. 6 is a diagram chosen by example, of a simple plant according to the invention with, to the right on the drawing, the temperatur structure shown for two types of room temperature keeping devices and for the flow in one of the ground heat exchangers of the energy storage during winter condition.

FIG. 6 discloses one of several in parallel connected ground heat exchangers GHEX with a heat insulated leg 20 and a non-insulated leg 24, as described above. The leg 24 is by a pipe 60 connected to an equipment for temporary energy SUES (Supplementary Energy Supply), which by a pipe 61 is connected to a collecting pipe 62. The leg 20 is by a pipe 63 connected to a device for collecting low-quality energy LEEC (Low Exergy Energy Collector), which by a pipe 64 is connected to a circulation pump 65 having its suction side connected to a second collecting pipe 66.

To the collecting pipes 62,66 are, partly a previously described room temperature keeping device RTKD-1 connected with a forward feeding pipe 70 and a return pipe 71, partly a previously described second room temperature keeping device RTKD-2 connected with a forward feeding pipe 72 to the channel 15 for the circulation fluid and a return pipe 73 from the channel 15. Exterior air in counter-current is fed through the channel 16 for tempering. An adjustable shunt 74 to the pipe 61 is connected to the outlet of the circulation pump 65, and at the inlet to the device LEEC is a second adjustable shunt 75 arranged connected to the pipe 63. To the pipes 60,63 of the ground heat exchanger GHEX is further a reversing valve 76 arranged for reversing of the terminals to the pipes 60,63.

For controlling and adjusting said components there is an information processor 77, which by signal lines 78.79 sense the temperature of the inlet and outlet fluids through the pipes 60,63. The information processor 77 can by signal lines 80,81 and 82 control connection and disconnection of the equipment for temporary complementary energy SUES, control the flow of the circulation pump 65, and possibly requisite flow through the shunt valve 74 (not shown). Besides, there is of course also further conventional control equipment, like thermostats for adjusting the room temperature in different rooms and for controlling the shunt valve 75 and so on (not shown).

In this example the basic temperature differences have been calculated to $F=6K$ $U=2K$ $L=2K$ Smin=10K The temperatures at the different components are then:

|  | in ° C. | out ° C. |
| --- | --- | --- |
| Winter time: | | |
| a) RTKD (warm keeping + ventilation air temp.) | 24 | 14 |
| b) GHEX (outlet of heat + loading of coldness) | 14 | 24 |
| c) LEEC (possible collecting of coldness) | — | — |
| Summer time: | | |
| a) RTKD (cool keeping + ventilation air temp.) | 18 | 25 |
| b) GHEX (heta loading + coldness out from ground) | 28 | 18 |
| c) LEEC (collecting heat) | 25 | 28 |

FIG. 6, which relates to winter operation, discloses the temperature curve 90 of the ventilation air, and the temperature curve 91 of the circulation fluid in the device RTKD-2. Further, the temperature curve 92 for the inner channel 12 and the temperature curve 93 for the outer channel 13 in the device RTKD-1 is shown. At last the temperature curve 94 is shown for the non-insulated leg 24 in the ground heat exchanger GHEX and the temperature curve 95 for the ground.

Figure 7:
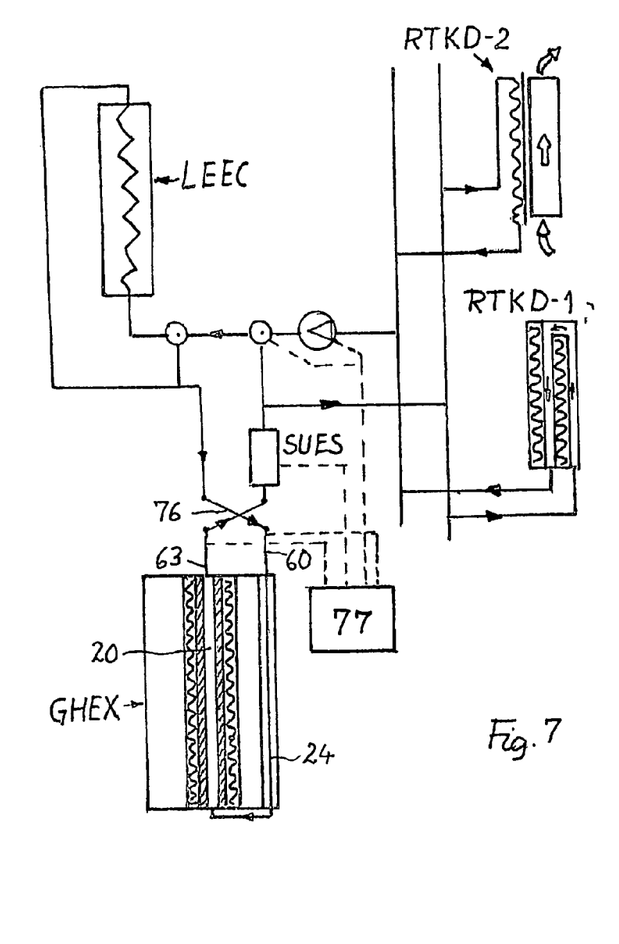
FIG. 7 is a diagram of the same plant as shown in FIG. 6 during summer condition and with temperature structures changed with respect thereto.

FIG. 7, which relates to summer operation discloses the corresponding curves as in FIG. 6 indicated with the same numerals provided with '-sign. Here the reversing valve 76 at the forward and return pipes of the ground heat exchanger GHEX has been activated, e.g. by a device for sensing the return temperature from the building (not shown) for connection of the pipe 63, which is connected to the insulated leg, to the collecting pipe 62.

It has been possible, by combining above all the above-mentioned components and utilizing the above outlined operating strategy, to cover the thermal need for tempering of the interior of a building as well as the ventilation air all the year round with only natural energy collected locally on the spot. Energy of higher quality, service energy, i.e. energy for control equipment, circulation pumps etc., must be added, but constitutes only a marginal part.

The plant according to the invention has many advantages. Especially the following may be pointed out:

Said components can, thanks to the extremely low operating temperatures, be given a simplified design but still get much better performance than conventional components in priorly known systems. This holds good for e.g. solar collectors, which here shall be unglazed for highest efficiency.

One and the same investment gives both a warm keeping and cool kepping function with practically no working expenses. This is quite commonly preferable, but in particular for buildings in places with inland climate, where the energy need is very large for both warm keeping and cool keeping, and in some of these regions it may be a question of collecting heat by day and coldness by night, at the same time as tempering of the building is carried out all the day and night.

It is especially important that warm keeping in the winter can be obtained at the same time as cool energy is collected and stored in the cold end of the energy storage, and that cool keeping in the summer can be obtained at the same time as heat energy is collected and stored in the warm end of the energy storage.

The invention is of course not restricted to the embodiments here shown and described but can be modified in different ways within the frame of the invention defined in the claims. This is a qustion of for example the circulation fluid, which mostly is a liquid, but in room temperature keeping devices incorporated in outer walls as a matter of precaution is in the form of air, where the change between liquid and air is carried out in a known manner by an efficient counter-current heat exchanger.

The invention claimed is:

1. A plant for tempering a building, comprising:
    an in-ground energy storage unit formed by a plurality of ground heat exchangers coupled in parallel, each ground heat exchanger including a first tube-shaped leg surrounded by heat insulation and a second leg in thermal connection with surrounding soil, the energy storage unit having a continuously varying temperature in a depth direction between a cold end and a warm end;
    at least one room temperature keeping device for at least one room;
    a circulation pump for circulating circulation fluid through a circulation circuit, which includes the circulation pump, the first and second legs of the ground heat exchangers, and the at least one room temperature keeping device, and in which the circulation fluid flows down one leg and up the other leg in each of the ground heat exchangers; and
    a valve device for controlling a flow direction of the circulation fluid in the ground heat exchangers such that when keeping a warm temperature in the at least one room, circulation fluid is directed to the at least one room temperature keeping device from the warm end of the energy storage unit and when keeping a cool temperature in the at least one room, circulation fluid is directed to the at least one room temperature keeping device from the cold end,
    wherein the circulation pump is controlled such that a temperature difference S between an inlet and an outlet of the ground heat exchangers at all operating conditions has a constant value equal to at least 50% of a fixed value $S_{MIN}$ for the plant,
    wherein $S_{MIN}=F+U+L$ where:
    F is a temperature difference between a required feeding temperature to the at least one room temperature keeping device at a maximum warm keeping power at cool ambient temperature and at maximum cool keeping power at warm ambient temperature;
    U is a required driving temperature difference at a ground surface between the ground and the circulation fluid in the second leg at maximum heat power outlet from the ground at cool ambient temperature; and
    L is a required driving temperature difference at the ground surface between the ground and the circulation fluid in the second leg at maximum cool power outlet from the ground at warm ambient temperature.

2. The plant according to claim 1, wherein when keeping the warm temperature in the at least one room, a temperature of the circulation fluid fed to the at least one room temperature keeping device is higher than a room temperature, and a temperature of the circulation fluid returning from the at least one room temperature keeping device is lower than the room temperature; and
    wherein when keeping the cool temperature in the at least one room, a temperature of the circulation fluid fed to the at least one room temperature keeping device is lower than a room temperature, and a temperature of the circulation fluid returning from the at least one room temperature keeping device is higher than the room temperature.

3. The plant according to claim 1, further comprising a device for complementary addition of energy which is connectable to the circulation circuit for affecting the temperature of the circulation fluid fed to the energy storage unit.

4. The plant according to claim 3, further comprising a device for complementary energy supply which is connected to a feeding line from the energy storage unit to at least one room temperature keeping device.

5. The plant according to claim 4, wherein the circulation pump is arranged in an outlet line from the at least one room temperature keeping device, and an adjustable shunt line is arranged between a point downstream of the circulation pump and a point upstream of the at least one room temperature keeping device.

6. The plant according to claim 3, wherein the circulation pump is arranged in an outlet line from the at least one room temperature keeping device, and an adjustable shunt line is arranged between a point downstream of the circulation pump and a point upstream of the at least one room temperature keeping device.

7. The plant according to claim 1, further comprising a device for complementary energy supply which is connected to a feeding line from the energy storage unit to at least one room temperature keeping device.

8. The plant according to claim 7, wherein the circulation pump is arranged in an outlet line from the at least one room temperature keeping device, and an adjustable shunt line is arranged between a point downstream of the circulation pump and a point upstream of the at least one room temperature keeping device.

9. The plant according to claim 1, wherein the circulation pump is arranged in an outlet line from the at least one room temperature keeping device, and an adjustable shunt line is arranged between a point downstream of the circulation pump and a point upstream of the at least one room temperature keeping device.

10. A plant for tempering a building, comprising:
an in-ground energy storage unit formed by a plurality of ground heat exchangers coupled in parallel, each ground heat exchanger including a first tube-shaped leg surrounded by heat insulation and a second leg in thermal connection with surrounding soil, the energy storage unit having a continuously varying temperature in a depth direction between a cold end and a warm end;
at least one room temperature keeping device for at least one room;
a circulation pump for circulating circulation fluid through a circulation circuit, which includes the circulation pump, the first and second legs of the ground heat exchangers, and the at least one room temperature keeping device, and in which the circulation fluid flows down one leg and up the other leg in each of the ground heat exchangers; and
a valve device for controlling a flow direction of the circulation fluid in the ground heat exchangers such that when keeping a warm temperature in the at least one room, circulation fluid is directed to the at least one room temperature keeping device from the warm end of the energy storage unit and when keeping a cool temperature in the at least one room, circulation fluid is directed to the at least one room temperature keeping device from the cold end,
wherein the circulation pump is controlled such that a temperature difference S between an inlet and an outlet of the ground heat exchangers at all operating conditions has a constant value equal to 100% of a fixed value $S_{MIN}$ for the plant,
wherein $S_{MIN}=F+U+L$
where:
F is a temperature difference between a required feeding temperature to the at least one room temperature keeping device at a maximum warm keeping power at cool ambient temperature and at maximum cool keeping power at warm ambient temperature;
U is a required driving temperature difference at a ground surface between the ground and the circulation fluid in the second leg at maximum heat power outlet from the ground at cool ambient temperature; and
L is a required driving temperature difference at the ground surface between the ground and the circulation fluid in the second leg at maximum cool power outlet from the ground at warm ambient temperature.

11. The plant according to claim 10, wherein when keeping the warm temperature in the at least one room, a temperature of the circulation fluid fed to the at least one room temperature keeping device is higher than a room temperature, and a temperature of the circulation fluid returning from the at least one room temperature keeping device is lower than the room temperature; and
wherein when keeping the cool temperature in the at least one room, a temperature of the circulation fluid fed to the at least one room temperature keeping device is lower than a room temperature, and a temperature of the circulation fluid returning from the at least one room temperature keeping device is higher than the room temperature.

12. The plant according to claim 10, further comprising a device for complementary addition of energy which is connectable to the circulation circuit for affecting the temperature of the circulation fluid fed to the energy storage unit.

13. The plant according to claim 12, further comprising a device for complementary energy supply which is connected to a feeding line from the energy storage unit to at least one room temperature keeping device.

14. The plant according to claim 13, wherein the circulation pump is arranged in an outlet line from the at least one room temperature keeping device, and an adjustable shunt line is arranged between a point downstream of the circulation pump and a point upstream of the at least one room temperature keeping device.

15. The plant according to claim 12, wherein the circulation pump is arranged in an outlet line from the at least one room temperature keeping device, and an adjustable shunt line is arranged between a point downstream of the circulation pump and a point upstream of the at least one room temperature keeping device.

16. The plant according to claim 10, further comprising a device for complementary energy supply which is connected to a feeding line from the energy storage unit to at least one room temperature keeping device.

17. The plant according to claim 16, wherein the circulation pump is arranged in an outlet line from the at least one room temperature keeping device, and an adjustable shunt line is arranged between a point downstream of the circulation pump and a point upstream of the at least one room temperature keeping device.

18. The plant according to claim 10, wherein the circulation pump is arranged in an outlet line from the at least one room temperature keeping device, and an adjustable shunt line is arranged between a point downstream of the circulation pump and a point upstream of the at least one room temperature keeping device.

19. A method for tempering a building using a plant for tempering the building, the plant comprising: (i) an in-ground energy storage unit formed by a plurality of ground heat exchangers coupled in parallel, each ground heat exchanger including a first tube-shaped leg surrounded by heat insulation and a second leg in thermal connection with surrounding soil, the energy storage unit having a continuously varying temperature in a depth direction between a cold end and a warm end, (ii) at least one room temperature keeping device for at least one room, (iii) a circulation pump for circulating circulation fluid through a circulation circuit, which includes the circulation pump, the first and second legs of the ground heat exchangers, and the at least one room temperature keeping device, and in which the circulation fluid flows down one leg and up the other leg in each of the ground heat exchangers, and (iv) a valve device for controlling a flow direction of the circulation fluid in the ground heat exchangers, the method comprising:
controlling the valve device such that when keeping a warm temperature in the at least one room, circulation fluid is directed to the at least one room temperature keeping device from the warm end of the energy storage unit and when keeping a cool temperature in the at least one room, circulation fluid is directed to the at least one room temperature keeping device from the cold end; and
controlling the circulation pump such that a temperature difference S between an inlet and an outlet of the ground heat exchangers at all operating conditions has a constant value equal to at least 50% of a fixed value $S_{MIN}$ for the plant,
wherein $S_{MIN}=F+U+L$
where:
F is a temperature difference between a required feeding temperature to the at least one room temperature keeping device at a maximum warm keeping power at cool ambient temperature and at maximum cool keeping power at warm ambient temperature;

U is a required driving temperature difference at a ground surface between the ground and the circulation fluid in the second leg at maximum heat power outlet from the ground at cool ambient temperature; and L is a required driving temperature difference at the ground surface between the ground and the circulation fluid in the second leg at maximum cool power outlet from the ground at warm ambient temperature.

20. The method according to claim 19, wherein the circulation pump is controlled such that the temperature difference S between the inlet and the outlet of the ground heat exchangers at all operating conditions has a constant value equal to 100% of the fixed value $S_{MIN}$.

* * * * *